(12) United States Patent
Grimm et al.

(10) Patent No.: US 9,503,184 B2
(45) Date of Patent: Nov. 22, 2016

(54) METHOD FOR ALIGNING A SENSOR DEVICE

(71) Applicant: Leuze electronic GmbH + Co. KG, Owen/Tuck (DE)

(72) Inventors: Hans Grimm, Fürstenfeldbruck (DE); Stefan Bischof, Leipheim (DE)

(73) Assignee: Leuze Electronic GmbH + Co. KG, Owen/Teck (DE)

( * ) Notice: Subject to any disclaimer, the term of this patent is extended or adjusted under 35 U.S.C. 154(b) by 4 days.

(21) Appl. No.: 14/813,165

(22) Filed: Jul. 30, 2015

(65) Prior Publication Data

US 2016/0043801 A1 Feb. 11, 2016

(30) Foreign Application Priority Data

Aug. 11, 2014 (EP) .................................... 14180502

(51) Int. Cl.
*H04B 10/00* (2013.01)
*H04B 10/114* (2013.01)
*G01V 8/20* (2006.01)

(52) U.S. Cl.
CPC ............. *H04B 10/1143* (2013.01); *G01V 8/20* (2013.01)

(58) Field of Classification Search
USPC .......................................... 398/118–131, 156
See application file for complete search history.

(56) References Cited

U.S. PATENT DOCUMENTS

| | | | | |
|---|---|---|---|---|
| 3,025,406 A * | 3/1962 | Stewart | ................... | G01P 3/685 250/221 |
| 3,704,396 A * | 11/1972 | Macdonald | ............. | F16P 3/144 250/221 |
| 3,746,863 A * | 7/1973 | Pronovost | ................. | F16P 3/14 250/208.4 |
| 3,805,061 A * | 4/1974 | De Missimy | ............. | F16P 3/14 250/208.3 |
| 3,810,148 A * | 5/1974 | Karsten | ............. | A63B 71/0605 250/221 |
| 4,015,122 A * | 3/1977 | Rubinstein | ................ | F16P 3/14 250/221 |
| 4,266,124 A * | 5/1981 | Weber | ....................... | F16P 3/14 250/221 |
| 4,650,990 A * | 3/1987 | Jonsson | ............... | H03K 17/943 250/221 |
| 5,003,169 A * | 3/1991 | Sakaguchi | ............... | G01V 8/20 250/221 |
| 5,015,840 A * | 5/1991 | Blau | ......................... | F16P 3/14 250/208.3 |
| 5,051,574 A * | 9/1991 | Yoshida | ................... | G01V 8/20 250/205 |
| 5,130,532 A * | 7/1992 | Clemens | .................. | G01V 8/20 250/221 |
| 5,149,921 A * | 9/1992 | Picado | ..................... | G01V 8/20 187/317 |
| 5,243,183 A * | 9/1993 | Barron, Jr. | ................. | F16P 3/14 250/221 |
| 5,245,178 A * | 9/1993 | Elias | ...................... | G01V 13/00 250/221 |
| 5,266,810 A * | 11/1993 | Murphy | .................... | G01V 8/20 250/222.1 |

(Continued)

FOREIGN PATENT DOCUMENTS

DE 202006012454 U1 10/2006
DE 102006050189 A1 5/2008

(Continued)

*Primary Examiner* — Agustin Bello
(74) *Attorney, Agent, or Firm* — Michael Soderman

(57) ABSTRACT

The invention relates to a method for aligning a sensor system, said sensor system having a transmitter unit having at least one light beam emit-ting transmitter and a receiver unit having at least one receiver as-signed to the transmitter, which receiver receives the light beams from the transmitter when the sensor system is in operation. In order to align the transmitter unit, an alignment receiver is positioned on the receiver unit in front of the receiver, said alignment receiver having a larger aperture angle than the receiver. The light beams emitted by the transmitter are received by the alignment receiver. Depending on the quantity of light of the light beams received by the alignment receiver, data are displayed on a display unit.

16 Claims, 4 Drawing Sheets

(56) References Cited

U.S. PATENT DOCUMENTS

| | | | | |
|---|---|---|---|---|
| 5,280,622 A * | 1/1994 | Tino | B25J 19/06 | 700/255 |
| 5,371,583 A * | 12/1994 | Yamaguchi | F27B 9/2407 | 250/222.1 |
| 5,461,227 A * | 10/1995 | Blau | G01V 8/20 | 250/221 |
| 5,463,498 A * | 10/1995 | Gal | G02B 3/0056 | 359/619 |
| 5,504,346 A * | 4/1996 | Page | C30B 25/12 | 250/222.1 |
| 5,567,931 A * | 10/1996 | Amend | G01V 8/20 | 250/214 B |
| 5,696,362 A * | 12/1997 | Amend | B66B 13/26 | 187/317 |
| 5,886,307 A * | 3/1999 | Full | B66B 13/26 | 187/317 |
| 5,900,598 A * | 5/1999 | Cottle | G01V 8/20 | 187/317 |
| 5,920,664 A * | 7/1999 | Hirabayashi | G02B 6/43 | 349/196 |
| 5,925,858 A * | 7/1999 | Full | B66B 13/26 | 187/317 |
| 6,051,829 A * | 4/2000 | Full | B66B 13/26 | 187/317 |
| 6,124,586 A * | 9/2000 | De Coi | F16P 3/14 | 250/221 |
| 6,137,408 A * | 10/2000 | Okada | G01V 8/20 | 250/221 |
| 6,167,991 B1 * | 1/2001 | Full | B66B 13/26 | 187/317 |
| 6,236,036 B1 * | 5/2001 | Kudo | G01V 8/20 | 250/221 |
| 6,239,423 B1 * | 5/2001 | Hama | G01V 8/20 | 250/221 |
| 6,414,603 B1 * | 7/2002 | Yamaguchi | F16P 3/14 | 250/221 |
| 6,509,992 B1 * | 1/2003 | Goodwill | H04B 10/1141 | 398/129 |
| 6,527,456 B1 * | 3/2003 | Trezza | G02B 6/43 | 385/116 |
| 6,583,445 B1 * | 6/2003 | Reedy | H01L 31/101 | 257/80 |
| 6,661,940 B2 * | 12/2003 | Kim | H04B 10/801 | 359/15 |
| 6,738,539 B2 * | 5/2004 | Hagood | G02B 6/022 | 385/16 |
| 6,775,480 B1 * | 8/2004 | Goodwill | H04B 10/11 | 398/119 |
| 6,815,660 B2 * | 11/2004 | Henkel | F16P 3/144 | 250/221 |
| 6,856,862 B1 * | 2/2005 | Feltner | F16P 3/14 | 250/221 |
| 6,872,932 B2 * | 3/2005 | Emmanuel | G01V 8/20 | 250/221 |
| 6,894,623 B2 * | 5/2005 | Hama | F16P 3/14 | 250/221 |
| 6,958,465 B2 * | 10/2005 | Haberer | G01V 8/20 | 209/586 |
| 6,968,133 B2 * | 11/2005 | Sakanaka | H04B 10/1127 | 398/122 |
| 7,039,265 B2 * | 5/2006 | Levy | H04B 10/801 | 385/14 |
| 7,120,363 B2 * | 10/2006 | Andreu-von Euw | H04B 10/1127 | 398/118 |
| 7,155,129 B2 * | 12/2006 | Bringans | H04B 10/801 | 359/814 |
| 7,177,550 B1 * | 2/2007 | Smith | H04B 10/1121 | 398/118 |
| 7,183,533 B2 * | 2/2007 | Osako | G01D 5/26 | 187/317 |
| 7,326,914 B2 * | 2/2008 | Pirkl | G01V 8/20 | 250/221 |
| 7,372,011 B2 * | 5/2008 | Green | G01C 15/006 | 250/214 R |
| 7,416,352 B2 * | 8/2008 | Goutzoulis | H04B 10/1141 | 385/24 |
| 7,446,302 B2 * | 11/2008 | Mason | G07F 9/02 | 221/7 |
| 7,534,986 B2 * | 5/2009 | Nakaso | H04B 10/803 | 250/216 |
| 7,609,972 B2 * | 10/2009 | Cunningham | H04B 10/1127 | 398/118 |
| 7,612,317 B2 * | 11/2009 | Chalfant, III | G01S 7/4817 | 250/203.1 |
| 7,612,329 B2 * | 11/2009 | Chalfant, III | H04B 10/40 | 250/234 |
| 7,643,755 B2 * | 1/2010 | Rafferty | H04B 10/118 | 398/118 |
| 7,646,986 B2 * | 1/2010 | Yasumoto | H04B 10/1149 | 398/119 |
| 7,653,108 B2 * | 1/2010 | Morris | H01S 5/4025 | 372/50.12 |
| 7,666,118 B1 * | 2/2010 | Anthony | A63B 21/0724 | 482/104 |
| 7,741,595 B2 * | 6/2010 | Lohmann | G01V 8/20 | 250/221 |
| 7,805,080 B2 * | 9/2010 | Wang | H04B 10/803 | 398/122 |
| 7,897,911 B2 * | 3/2011 | Meyer | F16P 3/14 | 250/221 |
| 7,960,681 B2 * | 6/2011 | Carnicelli | G01V 8/20 | 250/221 |
| 7,978,981 B2 * | 7/2011 | Buckman | H04B 10/801 | 398/118 |
| 8,051,954 B2 * | 11/2011 | Pustelniak | B66B 5/0087 | 187/317 |
| 8,058,605 B2 * | 11/2011 | Scheiber | F16P 3/14 | 250/208.4 |
| 8,115,914 B2 * | 2/2012 | Osako | G01V 8/20 | 250/221 |
| 8,138,770 B2 * | 3/2012 | Peschmann | G01V 5/0016 | 324/637 |
| 8,160,452 B1 * | 4/2012 | Tidwell | H04B 10/118 | 398/138 |
| 8,315,526 B2 * | 11/2012 | Tan | H04B 10/803 | 398/118 |
| 8,445,833 B2 * | 5/2013 | Klingelhofer | G01V 8/20 | 250/214 DC |
| 8,510,990 B2 * | 8/2013 | Agam | G01S 15/04 | 49/26 |
| 8,611,758 B2 * | 12/2013 | Kuo | H04B 10/803 | 398/118 |
| 8,836,957 B2 * | 9/2014 | Kietz | G01V 8/20 | 250/559.12 |
| 8,867,045 B2 * | 10/2014 | Piana | G01V 8/20 | 356/614 |
| 8,995,841 B1 * | 3/2015 | Chalfant, III | H04B 10/1125 | 398/119 |
| 9,128,201 B2 * | 9/2015 | Burger | G01V 8/20 | |
| 9,142,938 B2 * | 9/2015 | Morris | H01S 5/4025 | |
| 9,197,321 B2 * | 11/2015 | Tseng | H04B 10/0795 | |
| 9,274,510 B2 * | 3/2016 | Burger | G05B 9/02 | |
| 2002/0081060 A1 * | 6/2002 | Margalit | G02B 26/0841 | 385/18 |
| 2004/0096224 A1 * | 5/2004 | Naruki | H04B 10/0775 | 398/156 |
| 2004/0141753 A1 * | 7/2004 | Andreu-von Euw | H04B 10/1127 | 398/122 |
| 2005/0133702 A1 * | 6/2005 | Meyer | G01V 8/20 | 250/221 |
| 2006/0018216 A1 * | 1/2006 | Morris | H04B 10/116 | 369/47.1 |
| 2006/0278817 A1 * | 12/2006 | Pirkl | G01V 8/20 | 250/221 |
| 2006/0278818 A1 * | 12/2006 | Green | G01C 15/006 | 250/221 |
| 2007/0280694 A1 * | 12/2007 | Yasumoto | H04B 10/1149 | 398/119 |
| 2008/0008471 A1 * | 1/2008 | Dress | G06E 3/006 | 398/66 |
| 2008/0118247 A1 * | 5/2008 | Drago | H04B 10/118 | 398/122 |

(56) References Cited

U.S. PATENT DOCUMENTS

| | | | | |
|---|---|---|---|---|
| 2008/0284594 A1* | 11/2008 | Meyer | | F16P 3/14 340/541 |
| 2009/0202254 A1* | 8/2009 | Majumdar | | G01S 17/74 398/140 |
| 2010/0003029 A1* | 1/2010 | Dress | | G06E 3/006 398/66 |
| 2010/0046953 A1* | 2/2010 | Shaw | | H01S 5/423 398/115 |
| 2012/0086951 A1* | 4/2012 | Kietz | | G01V 8/20 356/603 |
| 2014/0341584 A1* | 11/2014 | Hopewell | | H04B 10/80 398/104 |
| 2014/0363166 A1* | 12/2014 | Lacovara | | H04B 10/80 398/104 |
| 2015/0188628 A1* | 7/2015 | Chalfant, III | | G02B 13/22 398/131 |
| 2016/0043801 A1* | 2/2016 | Grimm | | G01V 8/20 398/131 |
| 2016/0204866 A1* | 7/2016 | Boroson | | H04B 10/1121 398/97 |

FOREIGN PATENT DOCUMENTS

| | | |
|---|---|---|
| DE | 102008028970 A1 | 4/2009 |
| DE | 102012111345 A1 | 5/2014 |
| EP | 1437542 A1 | 7/2004 |
| EP | 1600684 A1 | 11/2005 |

\* cited by examiner

METHOD FOR ALIGNING A SENSOR DEVICE

CROSS-REFERENCE TO RELATED APPLICATIONS

This application claims the benefit under 35 USC 119 of European Application EP 14180502.8 filed on Aug. 11, 2014; all applications are incorporated by reference herein in their entirety.

BACKGROUND

The invention relates to a method for aligning a sensor system, and an alignment receiver for implementing the method.

Such sensor systems may be realized in particular in the form of light curtains. Such a light curtain comprises a transmitter unit with an arrangement of light beam emitting transmitters and a receiver unit with an arrangement of light beam receiving receivers. For detection of objects within a monitored area, the transmitter unit and the receiver unit are arranged at opposing edges of the monitored area such that, if the monitored area is empty, the light beams emitted from each transmitter strike its corresponding receiver. An object entering the monitored area is recognized in that at least one of the beam axes formed by the light beams of the light curtain is interrupted.

Before putting the light curtain into operation, i.e. so that is able to detect objects, the transmitter unit and the receiver unit must be suitably aligned. As an aid for such alignment, an alignment laser may for example be used, which emits alignment beams in the visible wavelength range. The alignment laser is mounted retroactively on the transmitter unit or the receiver unit. To align the transmitter unit and the receiver unit, a check is then carried out whether the alignment beams of the alignment laser strike a target on the receiver unit; the target may be provided by a target mark.

The general disadvantage of this procedure is that it is not the beam axes of the light curtain itself, which beam axes are formed by the individual light beams of the transmitter, that are aligned. The alignment beams, as an additional light axis, thus only provide indirect and consequently incomplete information about the actual alignment of the transmitters with the receivers. Such inaccuracies result in particular from tolerances in the mounting position of the alignment laser. Furthermore, the emission characteristics of the alignment laser on the one hand and the transmitter on the other often do not match.

In general, the alignment laser emits alignment beams with a narrow radiation pattern. Nonetheless, and particularly over large distances, the point of impact of the alignment beams on the receiver unit or transmitter unit is poorly visible. In order for the narrow bundle of light to hit the respective target of the receiver unit or the transmitter unit at all, exact positioning of the alignment laser on the transmitter unit or receiver unit is necessary, which makes the adjustment process a laborious one. Finally, it is disadvantageous that, when the unit on which the alignment laser is mounted is itself aligned in order to undertake the adjustment process, the adjusted position is at least partially lost again when the alignment laser is dismounted from the unit.

SUMMARY

The invention relates to a method for aligning a sensor system (1), said sensor system (1) having a transmitter unit (2) having at least one light beam (3) emitting transmitter (4) and a receiver unit (5) having at least one receiver (6) assigned to the transmitter (4), which receiver receives the light beams (3) from the transmitter (4) when the sensor system (1) is in operation. In order to align the transmitter unit (2), an alignment receiver (8) is positioned on the receiver unit (5) in front of the receiver (6), said alignment receiver (8) having a larger aperture angle than the receiver (6). The light beams (3) emitted by the transmitter (4) are received by the alignment receiver (8). Depending on the quantity of light of the light beams (3) received by the alignment receiver (8), data are displayed on a display unit (10).

DETAILED DESCRIPTION

The purpose of the invention is to provide a method and a system which enable the exact and reproducible alignment of a sensor system with minimal input of time and effort.

The features of the independent claims are intended to solve this problem. Advantageous embodiments and practical further developments of the invention are described in the subclaims.

The invention relates to a method for aligning a sensor system having a transmitter unit with at least one light beam emitting transmitter and a receiver unit with at least one receiver assigned to the transmitter, which receives the light beams of the transmitter when the sensor system is in operation. To align the transmitter unit, an alignment receiver is placed on the receiver unit in front of the receiver; this alignment receiver has a larger aperture angle than the receiver itself. The light beams emitted by the transmitter are received by the alignment receiver. Data are displayed on a display unit depending on the quantity of light from the light beams received by the alignment receiver.

A key benefit of the method in accordance with the invention is that the beam path of the light beams of the (or of a) transmitter of the sensor system is itself used to perform the alignment. The signals of the alignment receiver used for this purpose thus provide a direct measure of the correct alignment of the individual units of the sensor system, thus enabling the especially precise alignment of the individual units of the sensor system, in particular of the transmitter unit and the transmitter unit.

Of critical importance is the positioning of the alignment receiver in front of the receiver of the receiver unit; the alignment receiver should be positioned as precisely as possible in front of the receiver. The alignment receiver thus replaces this receiver, so that the signals generated with the alignment receiver provide a direct and precise measure of the alignment of the transmitter with the receiver.

One significant aspect of the invention is that the aperture angle of the alignment receiver is greater, and preferably significantly greater, than the aperture angle of the receiver or receivers. In this manner, an expanded capture region for the light beams of the associated transmitter is obtained, i.e. in the event that the alignment of the transmitter unit and receiver unit is still imperfect, in that the light beams of the transmitter would no longer strike the receiver, they nonetheless still strike the alignment receiver arranged on the receiver, so that even in this case the signals of the alignment receiver provide a measure of the existing alignment. In this way, a convenient and reproducible option for alignment is created, because, during the alignment process, which is normally performed before the sensor system is put into operation, the transmitter unit and receiver unit do not need to be preadjusted at the start of the alignment process; due to the large aperture angle of the alignment receiver, it can receive the light beams of the associated transmitter even when the system is poorly aligned, so that the signals generated by the alignment receiver can be used to align the sensor system.

A further benefit conferred by the large aperture angle of the alignment receiver is that, as the alignment progresses, a shallow-tailed light distribution function is obtained at the alignment receiver when the light beams of a transmitter are received. This means that, as the optimal alignment of the light beams on the alignment receiver is approached, the signals of the alignment receiver slowly but steadily increase in magnitude, so that the signals generated by the alignment receiver provide a quantitative measure of the accuracy of the alignment.

The method in accordance with the invention can be used both for light barriers with a single transmitter and receiver and for light curtains with multiple arrays of transmitters and receivers. For light curtains, depending on the functioning of the light curtain and the quality of the beam guidance of the individual beam axes, the alignment receiver can receive light beams from not just one, but from several transmitters. As the alignment receiver is positioned precisely in front of a receiver belonging to the light curtain, it also precisely reflects the conditions when the light curtain is in operation.

The method in accordance with the invention can also be used for more complex sensor systems. In particular, the sensor system may comprise in addition to the transmitter unit and receiver unit, a deflector unit having at least one deflection mirror, such that, when the sensor system is in operation, the light beams emitted by a transmitter of the transmitter unit are sent to the associated receiver of the receiver unit by way of the deflection mirror. In order to align the transmitter unit with respect to the deflector unit, the alignment receiver is positioned in front of the deflector mirror.

Once the transmitter unit has been aligned with respect to the deflector unit, the alignment receiver is positioned in front of the associated receiver of the receiver unit in order to align the deflector unit with respect to the receiver unit.

The alignment receiver in accordance with the invention is a component of an alignment receiver unit, which alignment receiver unit also comprises a processing unit. Signals present at the output of the alignment receiver are evaluated in the processing unit, and based on these signals output variables are generated that represent a measure of the quality of the alignment. The processing unit has means for transmitting the output variables to the display unit. The alignment receiver unit has means for attachment to a receiver unit or deflector unit.

With these attachment means, the alignment receiver unit can be reversibly affixed to a receiver unit or deflector unit. These means could consist, for example, of a Velcro strip, a strap, or a screw connection.

In the processing unit of the alignment receiver unit, output variables are generated on the basis of the signals received by the alignment receiver, and said output variables represent a measure of the quality of the alignment of the units to be adjusted. These output variables are continuously displayed on the display unit during alignment, so that an operator can control the alignment process by means of these output variables. In order to obtain a reproducible display, the output variables may be normalized by means of gain adjustment, controlled via the processing unit. These output variables are formed in particular by the light intensities registered by the alignment receivers.

In accordance with a first variant, the display unit is integrated into the alignment receiver itself, so that an operator can control the alignment process directly at the alignment receiver.

In this case, the display unit is advantageously embodied as an optical display. The optical display may be formed, for example, by three light-emitting diodes of different colors, red, green, and blue. The blue LED, for example, lights up by itself when the alignment receiver is turned on and no signal is being received, i.e. when the units to be adjusted are completely out of alignment, so that no light whatsoever from the associated transmitter reaches the alignment receiver. Only the red LED, for example, lights up when a weak light signal from the associated transmitter is registered by the alignment receiver, i.e. when the units are still insufficiently aligned. Finally, only the green LED can light up when the alignment of a sufficient quantity of light is registered, e.g. a quantity exceeding a predetermined threshold value.

Alternatively, a flashing LED can be used as an optical display. The frequency with which the LED flashes ideally increases along with improving alignment quality, i.e. with the quantity of light registered by the alignment receiver. The display thus forms a proportional display, by means of which the alignment procedure can be performed with particular precision.

In an alternative embodiment, the display unit may form a unit spatially separate from the alignment receiver unit. In this case, the display unit has transmission means by which data packets, in particular output variables generated directly in the processing unit, are sent to and displayed on the display unit.

The transmission means are provided e.g. in the form of a WLAN or Bluetooth interface.

The external unit is, in particular, a smartphone.

Acoustic signal transducers may be provided as display units. Optical displays on the display screen of the smartphone are also possible. The output variables may also be indicated by vibration of the smartphone.

Generally, external units may also be provided in the form of tablet computers, laptops, etc.

In one advantageous version of the invention, the sensor system comprises a transmitter unit with at least one light beam emitting transmitter and a receiver unit with at least one light beam receiving receiver for detecting objects in a monitored area. Integrated into the sensor system is an alignment receiver having a larger aperture angle than the one or any receiver. The light beams emitted by the transmitter or by another transmitter are received by the alignment receiver. Data are displayed with a display unit on the basis of the light quantity of the light beams received by the alignment receiver.

In contrast to the preceding variants, the alignment receiver is thus integrated permanently into the sensor system.

This variant is particularly advantageous for a sensor system in the form of a light curtain, which has a transmitter unit with a plurality of light beam emitting transmitters and a plurality of light beam receiving receivers, wherein one transmitter and one receiver respectively form a cooperating pair, such that, if there is no object in the monitored area, the light beams of the transmitter are sent to the corresponding receiver, thus forming a beam axis of the light curtain. The alignment receiver then replaces one of the receivers, so that this beam axis is then only available for aligning the sensor system, and no longer for the detection of objects in the monitored area. In principle, the alignment receiver can also be used for object detection in the case that the sensor system is used in a safety-related application. The optical behavior of the alignment receiver can in principle also be modified depending on whether it is to be used for object detection or for alignment purposes.

In accordance with one advantageous embodiment of the invention, the sensor system assigned to the alignment receiver is configured as a safety sensor.

Such a safety sensor is generally used to monitor a hazard area on production equipment such as a machine or a technical installation. Depending on the object detection performed, the safety sensor generates a safe switch signal by means of which the production equipment is controlled. The operation of the production equipment is only permitted by the safety sensor by means of the switch signal if no safety-critical object is detected within the monitored area. If, on the other hand, such an object is detected, the safety sensor switches to a safe mode, so that the switch signal shuts off the production equipment.

The safety sensor or the alignment receiver integrated in it advantageously has means by which the safety sensor is placed into a safe mode during the alignment process.

This ensures that no hazardous situations occur during the alignment process as a result of the safety sensor being used for the alignment operations. This changeover into a safe mode may occur, for example, by having the alignment receiver, which is placed on the safety sensor, always cover another receiver, so that the light beams from the corresponding transmitter can no longer be received, thus simulating the presence of an object within the monitored area.

BRIEF DESCRIPTION OF THE DRAWINGS

The invention is explained as follows by means of the drawings, which show.

DETAILED DESCRIPTION OF THE PREFERRED EMBODIMENTS

Figure 1:
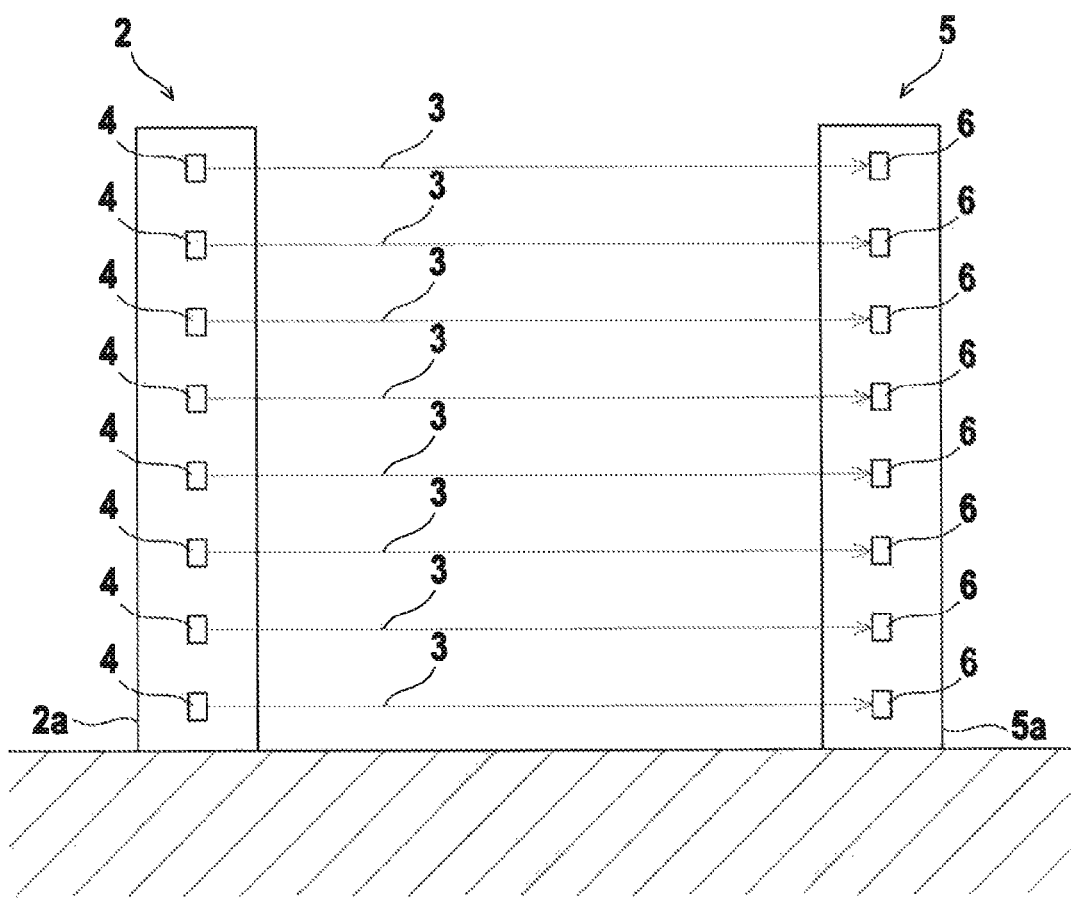
FIG. 1: Schematic view of a sensor system in the form of a light curtain.

FIG. 1 shows a first embodiment of a sensor system 1 in the form of a light curtain. The light curtain comprises a transmitter unit 2 with a housing 2*a* in which multiple transmitters 4 emitting light beams 3 are arranged. The transmitters 4 advantageously comprise light-emitting diodes that emit light in the infrared range, i.e. in the non-visible wavelength spectrum. The light curtain also comprises a receiver unit 5 with a housing 5*a*, in which are arranged receivers 6 to receive the light beams 3. The receivers 6 are advantageously formed by photodiodes.

The light curtain serves to monitor objects in a monitored area. The transmitter unit 2 and the receiver unit 5 are arranged at opposite edges of the monitored area. Each transmitter 4 is assigned to a receiver 6, in such a way that, when the monitored area is empty, as depicted in FIG. 1, the light beams 3 of the transmitter 4 strike the corresponding receiver 6 unhindered. The receiver/transmitter pairs thus formed are activated sequentially in a cycle by control means (not shown). The beam axes formed by the light beams 3 run in a plane forming the monitored area. When an object enters the monitored area, it interrupts at least one beam axis. The detection of the object occurs by evaluating the amplitude of the received signals of the receivers 6. The received signals are preferably evaluated in an evaluation unit (not shown) using a threshold value. This generates a binary switch signal that is output via a switch output. The switching states of the switch signal indicate whether an object is located in the monitored area or not.

Before the light curtain is put into operation, during which the light curtain is used to detect objects, the transmitter unit 2 and the receiver unit 5 must be aligned with one another.

Figure 2:
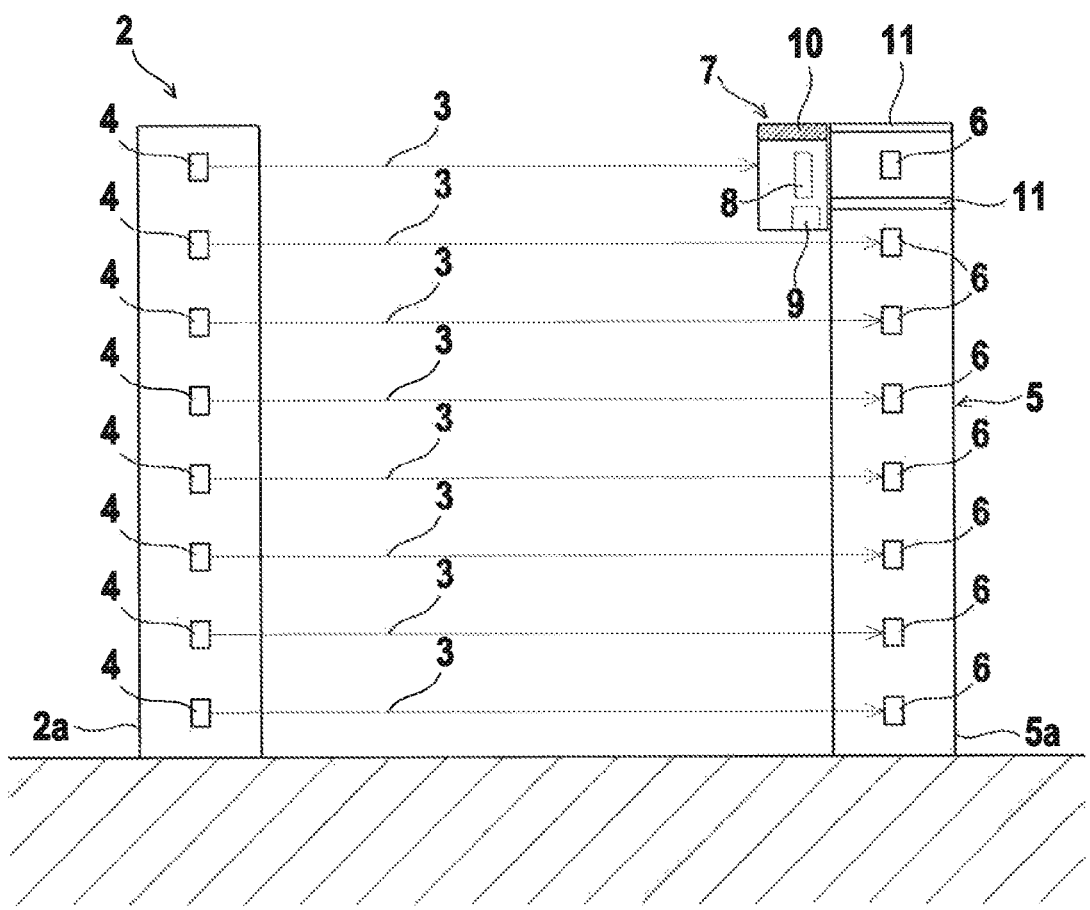
FIG. 2: Sensor system in accordance with FIG. 1 with an attached alignment receiver unit.
Figure 3:
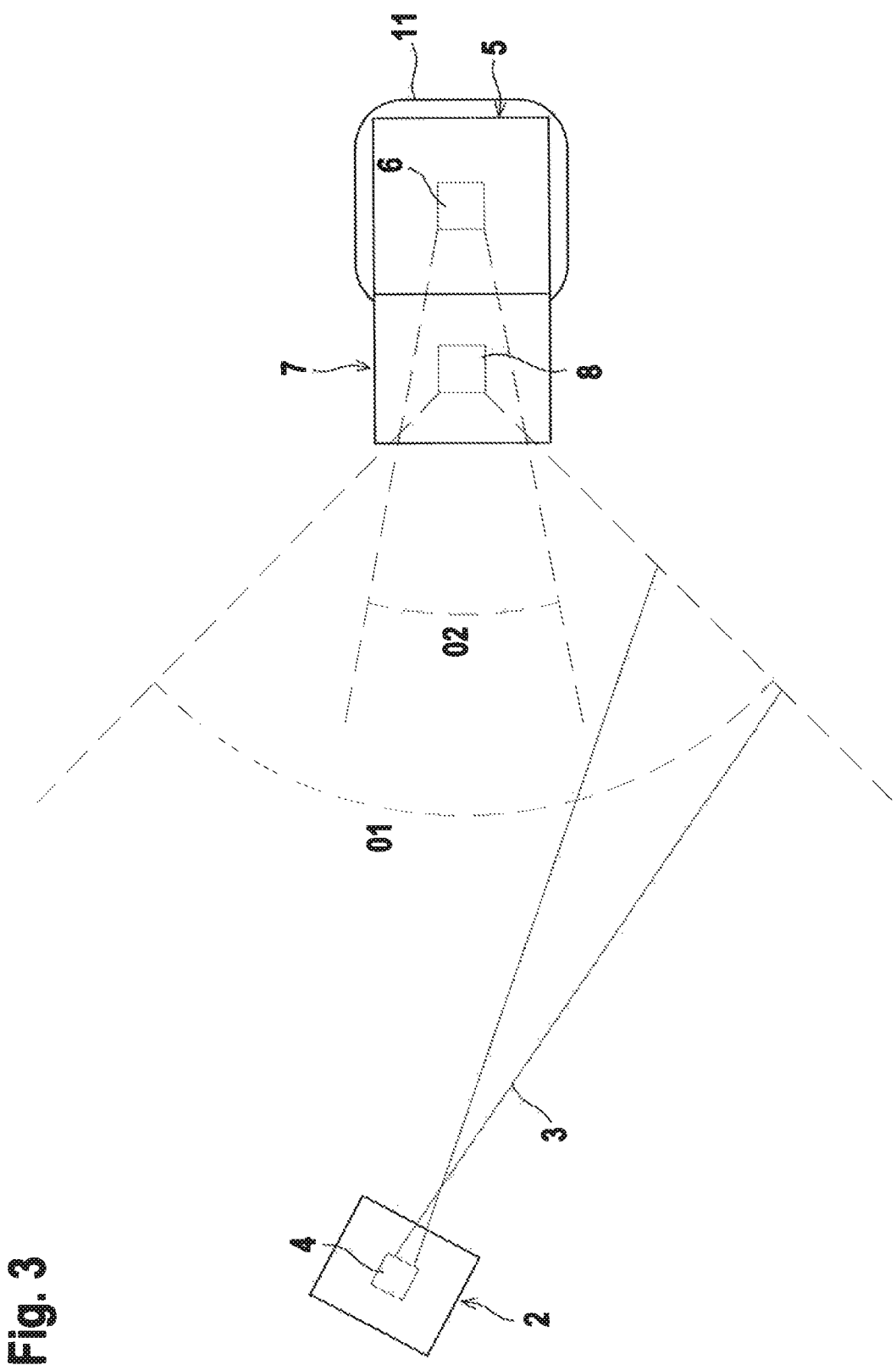
FIG. 3: Cross-sectional view of the configuration in accordance with FIG. 2.

In accordance with the invention, an alignment receiver unit 7 with an alignment receiver 8 is used for this purpose, as illustrated in FIGS. 2 and 3. The alignment unit 7 comprises furthermore a processing unit 9 and a display unit 10. The display unit 10 in the present case is formed by a light emitting diode which flashes at a predefined frequency and emits visible light. The display unit 10 also has Velcro straps as attachment means 11.

As FIGS. 2 and 3 show, the alignment receiver unit 7 is affixed to the receiver unit 5 with the Velcro straps 11 such that the alignment receiver 8 is positioned precisely in front of one of the receivers 6 of the receiver unit 5. In the present case, the alignment receiver 8 is arranged in front of the uppermost receiver 6, but the alignment receiver 7 can be positioned in front of any of the receivers 6.

In particular in the event that the radiation cone of the light beams 3 is shaped such that, given an unobstructed beam path, the beams strike multiple receivers 6, it is practical to position the alignment receiver unit 7 in front of a central receiver 6, rather than in front of a receiver 6 at the edge of the receiver unit 5. Because the alignment receiver 8 then receives the light beams 3 of multiple transmitters 4, the quality of the alignment is improved. In particular, divergent radiation characteristics of the light beams 3 can be compensated for.

Through the placement of the alignment receiver unit 7 in front of the uppermost receiver 6, the light beams 3 of the corresponding transmitter 4 no longer strike the receiver 6 of the light curtain, but rather the alignment receiver 8 arranged in front of it. The quantity of light striking the alignment receiver 8 is registered in the processing unit 9 of the alignment receiver unit 7 and displayed as an output variable on the display unit 10.

In order that the alignment receiver 8 selectively detects only light from the transmitter 4 of the light curtain, the alignment receiver may be provided with optical filters to filter out extraneous light, in particular ambient light. Electric filters may also be provided to ensure that only light corresponding to the pulse frequency of the light beams 3 from the transmitter 4 is registered by the alignment receiver 8.

As can be seen from the cross-sectional view of FIG. 3, the alignment receiver 8 has an aperture angle 01 which is significantly greater than the aperture angle 02 of the receiver 6 of the light curtain.

The alignment receiver 8 can thus also be used for an alignment if the light beams 3 from the transmitter 4 are no longer detected by the limited aperture angle 02 of the receiver 6, but can still be detected by the aperture angle 01 of the alignment receiver 8. This situation is illustrated in FIG. 3. The longitudinal axis of the transmitter unit 2 is sharply skewed, so that the light beams 3 from the transmitter 4 would no longer impinge within the aperture angle 02 of the receiver 6, i.e. would no longer be detected by this receiver 6. However, the light beams 3 from the transmitter 4 do still impinge within the aperture angle 01 of the alignment receiver 8, so that an alignment of the transmitter unit 2 relative to the receiver unit 5 can be performed by means of the signals from the alignment receiver 8 and the output variables indicated thereby on the display unit 10.

In the situation shown in FIG. 3, the transmitter unit 2 is sharply out of alignment with the receiver unit 5, so that only a small quantity of light reaches the alignment receiver 8. This is visualised as an output variable on the display unit 10 in that the LED comprising the display unit 10 flashes at a correspondingly low flashing frequency. The operator performing the alignment then rotates the transmitter unit 2 about its longitudinal axis in order to improve its alignment with regard to the receiver unit 5. The better the alignment, the more light from the transmitter 4 reaches the alignment receiver 8, and the higher the flashing frequency of the LED. If the transmitter unit 2 is optimally aligned with the receiver unit 5, the LED flashes at a maximum flashing frequency, or it emits a continuous light. In this way, the operator can precisely align the transmitter unit 2 with the receiver unit 5.

Figure 4:
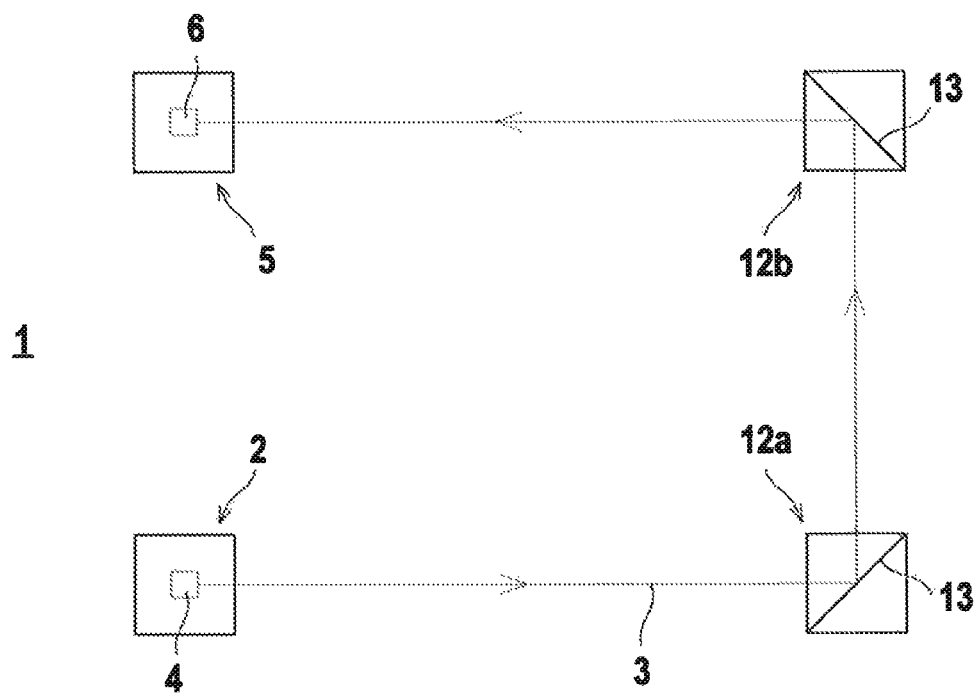
FIG. 4: Schematic view of a sensor system with a transmitter unit, a receiver unit, and two deflector units.

FIG. 4 shows an expansion of the sensor system 1 in accordance with FIG. 1. In addition to the transmitter unit 2 and the receiver unit 5, the sensor system 1 in accordance with FIG. 4 comprises two deflector units 12a, 12b, each with a deflector mirror 13a, 13b. The deflector units 12a, 12b are preferably identical in design. By means of the deflector mirrors 13a, 13b of the deflector units 12a, 12b, the light beams 3 of the transmitters 4 of the transmitter unit 2 are each deflected by 90°. After the light beams 3 have been deflected twice by the deflector units 12, 12b, they impinge on the receivers 6 of the receiver unit 5. The beam axes of the light beams 3 always run parallel to one another. This is achieved by ensuring that the longitudinal axes of the deflector units 12a, 12b with the deflector mirrors 13a, 13b, like the longitudinal axes of the transmitter unit 2 and receiver unit 5, run parallel to one another in the vertical direction. A monitored area running in three vertical planes is monitored with this sensor system 1.

To adjust this sensor system 1, the alignment receiver unit 7 in accordance with FIGS. 2 and 3 is again used. The alignment process is performed in this case in three stages.

Figure 5:
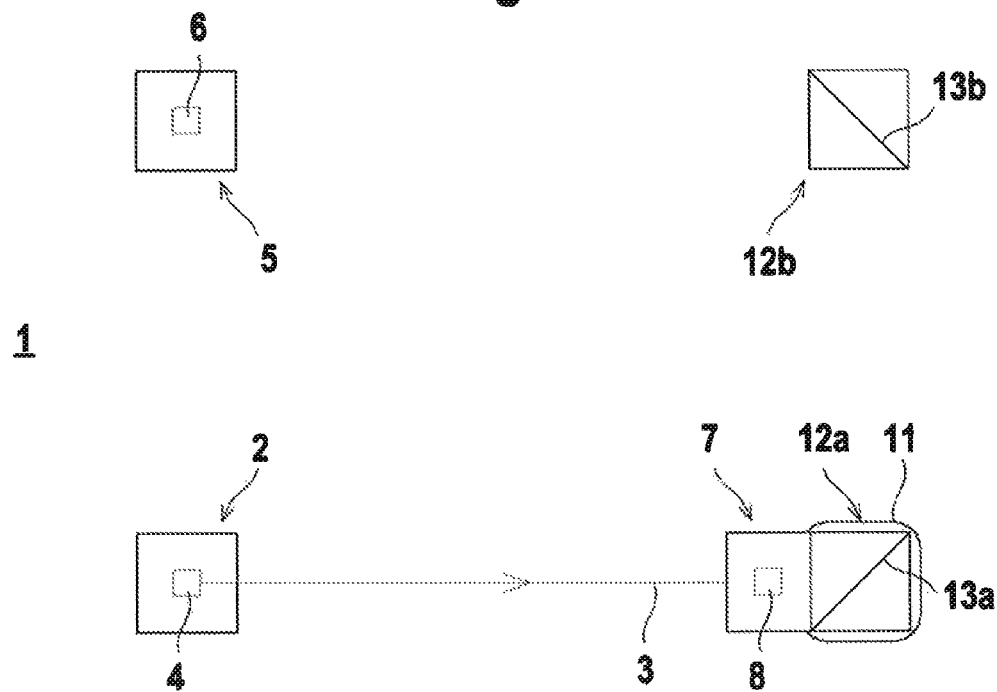
FIG. 5: Configuration in accordance with FIG. 4 with an alignment receiver unit.

The first step of the alignment is illustrated in FIG. 5. In the illustration, the alignment receiver unit 7 is positioned on the first deflector unit 12a such that the light beams 3 from a transmitter 4 impinge on the alignment receiver 8 of the alignment receiver unit 7. The alignment of the transmitter unit 2 with regard to the deflector unit 12a is performed on the basis of the light quantity registered by the alignment receiver 8, analogously to the example given in FIGS. 2 and 3.

The second step of the alignment then follows. In this adjustment step, the alignment receiver 7 is positioned on the second deflector unit 12b such that light beams 3 from a transmitter 4 of the transmitter unit 2 are sent from the transmitter 4 via the deflector mirror 13a of the first deflector unit 12a to the alignment receiver 8 on the second deflector unit 12b. The alignment of the deflector unit 12a with regard to the deflector unit 12b is performed on the basis of the light quantity received by the alignment receiver 8, analogously to the example given in FIGS. 2 and 3.

Finally, in a third step of the alignment process, the alignment receiver unit 7 is fixed in place in front of a receiver 6 of the receiver unit 5. In this adjustment step, the light beams 3 from the transmitter 4 are sent to the alignment receiver 8 via the two deflector units 12a, 12b. The second deflector unit 12b is aligned relative to the receiver unit 5 on the basis of the light quantities registered by the alignment receiver 8 and also of the output variables derived therefrom and displayed on the display unit 10.

LIST OF REFERENCE NUMERALS (1) Sensor system
(2) Transmitter unit
(2a) Housing
(3) Light beams
(4) Transmitter
(5) Receiver unit
(5a) Housing
(6) Receiver
(7) Alignment receiver unit
(8) Alignment receiver
(9) Processing unit
(10) Display unit
(11) Velcro strap
(12a, b) Deflector unit
(13a, b) Deflector mirror

The invention claimed is:

1. Method for aligning a sensor system (1), comprising a transmitter unit (2) having at least one light beam (3) emitting transmitter (4) and a receiver unit (5) having at least one receiver (6) assigned to the transmitter (4), which, when the sensor system (1) is operational, receives the light beams (3) transmitted by the transmitter (4), characterized in that, in order to align the transmitter unit (2) with the receiver unit (5), an alignment receiver (8) having a larger aperture angle than the receiver (6) is positioned in front of the receiver (6), and in that the alignment receiver (8) receives the light beams (3) emitted by the transmitter (4), and in that data are displayed on a display unit (10) on the basis of the quantity of light of the light beams (3) received by the alignment receiver (8).

2. Method in accordance with claim 1, characterized in that the sensor system (1) comprises a transmitter unit (2) with multiple transmitters (4) and a receiver unit (5) with multiple receivers (6) assigned to the transmitters (4) of the transmitter unit (2), and in that the alignment receiver (8) is positioned in front of one of the receivers (6) to align the transmitter unit (2) with the receiver unit (5), and in that the light beams (3) emitted from the transmitter (4) assigned to this receiver (6) are received by the alignment receiver (8), and in that data are displayed on a display unit (10) on the basis of the quantity of light of the light beams (3) received by the alignment receiver (8).

3. Method in accordance with claim 2, characterized in that the alignment receiver (8) receives the light beams (3) from multiple transmitters (4).

4. Method in accordance with claim 1, characterized in that the sensor system (1) comprises, in addition to the transmitter unit (2) and receiver unit (5), a deflector unit (12a, 12b) having at least one deflector mirror (13a, 13b), wherein, when the sensor system (1) is in operation, the light beams emitted from a transmitter (4) of the transmitter unit (2) are sent to the corresponding receiver (6) of the receiver unit (5) via the deflector mirror (13a, 13b), and in that the alignment receiver (8) is positioned in front of the deflector mirror (13a, 13b) in order to align the transmission unit (2) with respect to the deflector unit (12a, 12b).

5. Method in accordance with claim 4, characterized in that, once the transmitter unit (2) is aligned with respect to the deflector unit (12a, 12b), the alignment receiver (8) is positioned in front of the corresponding receiver (6) of the receiver unit (5) in order to align the deflector unit (12a, 12b) with respect to the receiver unit (5).

6. Method in accordance with claim 1, characterized in that the alignment of the sensor system (1) is carried out during an alignment process prior to the operation of the sensor system (1).

7. Alignment receiver (8) for aligning a sensor system (1) in accordance with the method of claim 1, characterized in that the alignment receiver (8) is a component of an alignment receiver unit (7) forming a structural unit, wherein the alignment receiver unit (7) has a processing unit (9), in which signals present at the output of the alignment receiver (8) are analyzed, and wherein output variables are generated on the basis of the signals in the processing unit (9), said output variables providing a measure of the quality of the alignment, and wherein the processing units (9) have means to transmit the output variables to the display unit (10), and wherein the alignment receiver unit (7) has means for attachment to a receiver unit (5) or deflector unit (12a, 12b).

8. Alignment receiver in accordance with claim 7, characterized by having filters to filter out extraneous light.

9. Alignment receiver in accordance with claim 7, characterized in that the display unit (10) is a component of the alignment receiver unit (7).

10. Alignment receiver in accordance with claim 9, characterized in that the display unit (10) is embodied in the form of an optical display.

11. Alignment receiver in accordance with claim 7, characterized in that the processing unit (9) has transmission means, by which the output variables are transmitted to an external display unit (10).

12. Alignment receiver in accordance with claim 11, characterized in that the transmission means are in the form of a WLAN or Bluetooth interface.

13. Alignment receiver in accordance with claim 11, characterized in that the external unit is a smartphone.

14. Alignment receiver for aligning a sensor system (1), wherein the sensor system (1) has a transmitter unit (2) having at least one light beam (3) emitting transmitter (4) and a receiver unit (5) having at least one light beam (3) receiving receiver (6) for detecting objects in a monitored area, characterized in that an alignment receiver (8) is integrated into the sensor system (1), said alignment receiver having a larger aperture angle than the one or any receiver (6), and in that the light beams (3) emitted from the transmitter (4) or from another transmitter (4) are received by the alignment receiver (8), and in that date are displayed on a display unit (10) on the basis of the quantity of light of the light beams (3) received by the alignment receiver (8).

15. Alignment receiver in accordance with claim 7, characterized in that it is assigned to a safety sensor.

16. Alignment receiver in accordance with claim 15, characterized in that means are provided by which the safety sensor is placed in a safe state during the alignment process.

* * * * *

UNITED STATES PATENT AND TRADEMARK OFFICE
CERTIFICATE OF CORRECTION

PATENT NO. : 9,503,184 B2
APPLICATION NO. : 14/813165
DATED : November 22, 2016
INVENTOR(S) : Hans Grimm and Stefan Bischof It is certified that error appears in the above-identified patent and that said Letters Patent is hereby corrected as shown below:

On the Title Page

Item (71) reads "Applicant: Leuze electronic GmbH + Co. KG, Owen/Tuck (DE)", should read "Applicant: Leuze electronic GmbH + Co. KG, Owen/Teck (DE)".

Signed and Sealed this
Tenth Day of January, 2017

Michelle K. Lee
*Director of the United States Patent and Trademark Office*